UNITED STATES PATENT OFFICE.

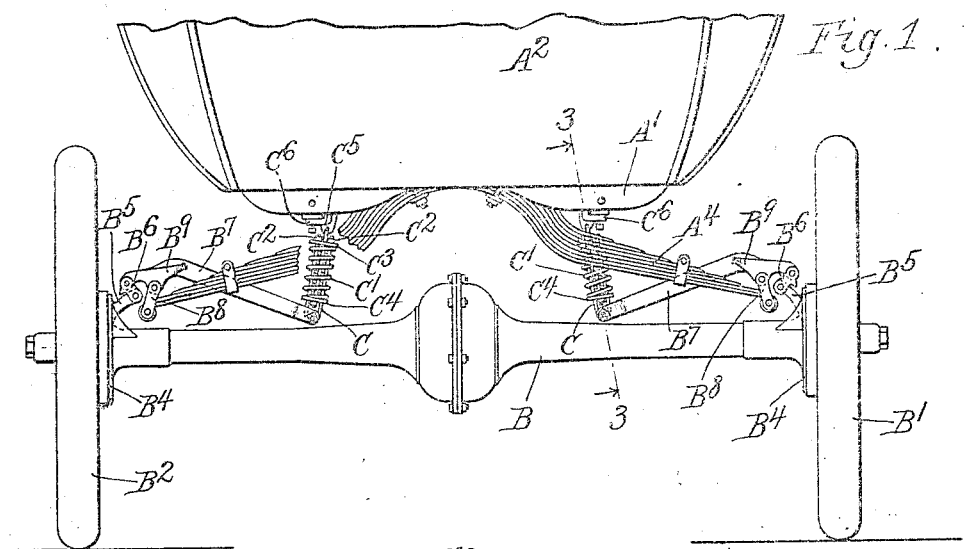
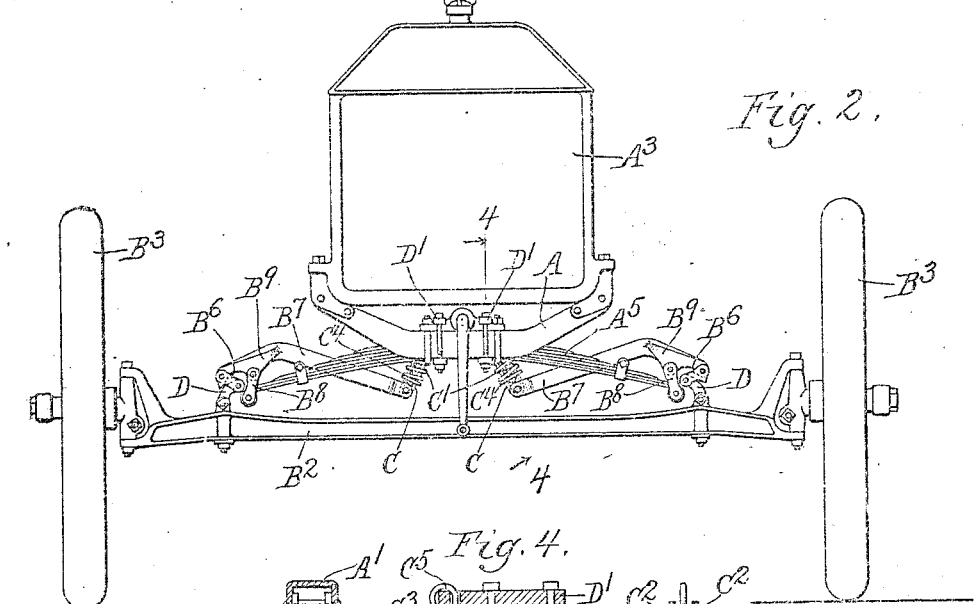
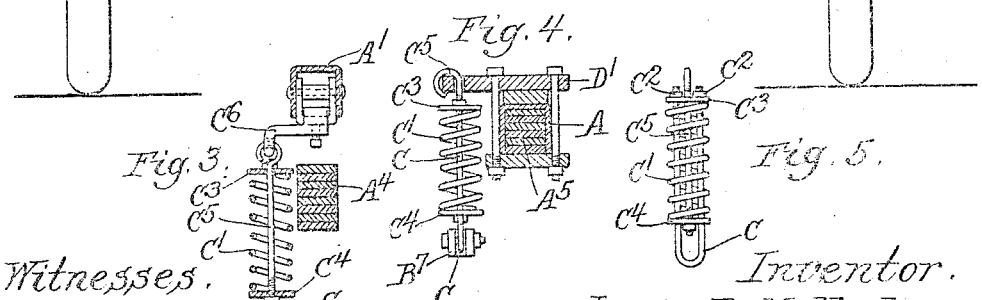

LEWIS P. HALLADAY, OF STREATOR, ILLINOIS.

SHOCK-ABSORBER.

1,243,599.          Specification of Letters Patent.          Patented Oct. 16, 1917.

Application filed August 2, 1915. Serial No. 43,097.

*To all whom it may concern:*

Be it known that I, LEWIS P. HALLADAY, a citizen of the United States, residing at Streator, in the county of La Salle and State of Illinois, have invented a certain new and useful Improvement in Shock-Absorbers, of which the following is a specification.

My invention relates to improvements in shock absorbers, and has for one object to provide a new and improved auxiliary spring means for Ford automobiles and the like. Another object is to provide an auxiliary spring which may be easily and conveniently attached without material change of the arrangement of the normal spring suspension. Other objects will appear from time to time in the specification. My invention is illustrated more or less diagrammatically and is applied to the well known type of the spring support used for Ford automobiles and the like. It is illustrated in the accompanying drawings wherein—

Figure 1 is a rear view with parts broken away.

Fig. 2 is a front view.

Fig. 3 a section along the line 3—3 of Fig. 1.

Fig. 4 a section along the line 4—4 of Fig. 2.

Fig. 5 a detail of the spring.

Like parts are indicated by similar letters throughout all the figures.

A is the front cross member, and $A^1$ the rear cross member of an automobile frame which supports the body $A^2$ and radiator $A^3$. Rigidly attached at its center to the frame $A^1$ is a transverse rear spring $A^4$, and to the frame member A is a transverse forward spring $A^5$.

B is the rear axle of the automobile provided with wheels $B^1$, $B^2$ the front axle mounted on wheels $B^3$. The rear axle B has at either end brake housings $B^4$, $B^4$. From these housings project fixed spring hangers $B^5$. These hangers normally support the ends of the springs by means of the spring links $B^6$, which, under ordinary circumstances, are directly coupled to the ends of the spring. In my arrangement, however, these spring links support the end of levers $B^7$, and these levers in turn being pivoted on these links, support the ends of the springs by means of some similar spring links $B^8$. The pivotal point of both sets of links on the spring being comparatively close together, and the relative arrangement and size of the parts being such that with the lever in the position shown, the distance from the pivot line on the spring hanger to the spring eye is substantially the same as it would be if the spring were directly suspended by the links from the hanger. The lever $B^7$ is off set as indicated at $B^9$ so as to pass down along one side of the transverse spring. Its end is supported by a loop C, and this loop extends upward through a coil spring $C^1$, where it is anchored by the nut $C^2$ on a spring plate $C^3$, which rests on the upper end of the coil spring. The lower end of the coil spring rests on a plate $C^4$, which in turn is suspended by a rod $C^5$ from a bracket $C^6$ on the transverse frame $A^1$, so that any up and down movement of the automobile body with respect to the axle will vary the pressure applied through the transverse spring to the lever and cause the lever to oscillate compressing the coil spring.

The arrangement for the front axle is substantially the same except that instead of the spring hanger $B^5$ projecting from the brake drum housing, there is a hanger D projecting up through the axle. It carries the lever and links in exactly the same manner as in the previous case, but in this case the coil spring is supported from a yoke $D^1$ which passes around both the front cross frame member and the spring itself.

It will be evident that while I have shown in my drawings an operative device, still many changes might be made in size, shape and arrangements of parts, without departing from the spirit of my invention.

The use and operation of my invention are as follows:—

As the vehicle travels over the road striking bumps, obstructions and the like, the axle of course moves up and down. In ordinary circumstances the cross spring only cushions the blow. This cross spring must be stiff and more or less rigid to carry the weight of the vehicle and so for the lighter bumps does not act as an adequate cushion. It is necessary to have a very sensitive spring to cushion the lighter bumps and short vibration. A spiral spring does this work splendidly, but if the load is directly supported by a spiral spring, the spring must be stiff itself to carry the load. It is desirable to have a light weight flexible spring which will give easily and readily. In order to do this, I provide a lever pivoted on a movable axis on the axle of the car, and suspending the weight of the car as applied by the transverse springs at a point adjacent the fulcrum. The working arm projects out where it is supported by a light flexible coil spring, so that as pressure is brought to bear on the lever, it oscillates flexing this light weight coil spring in the usual manner, which, by its light weight and flexibility, is enabled easily to respond to variations in load.

I claim:

1. A spring suspension for a road vehicle, comprising a leaf spring, a supporting bracket, a lever interposed between the spring and the bracket, pivoted links interposed respectively between the bracket and lever and between the lever and spring, and a resilient support for the free end of the lever interposed between it and the vehicle body.

2. A spring suspension for a road vehicle, comprising a leaf spring, a supporting bracket, a lever interposed between the spring and the bracket, pivoted links interposed between the bracket and one end of the the lever and between the lever and spring, and a resilient support for the free end of the lever interposed between it and the vehicle body.

3. A spring suspension for road vehicles, comprising a leaf spring, a supporting bracket adjacent the end of the spring, a lever one end of which is located on the side of the bracket removed from the spring, a pivot link connection between such end of the lever and the bracket, and a pivot link connection between the end of the spring and the lever together with a yielding support for the free end of the lever.

4. A spring suspension for road vehicles, comprising a leaf spring, a supporting bracket, a lever, a pivot link connection between the end of the lever and the bracket and between the end of the spring and the lever, and a yielding support for the free end of the lever.

5. A spring suspension for road vehicles, comprising a leaf spring, a supporting bracket adjacent the end of the spring, a lever, one end of which is located on the side of the bracket opposed to the spring, a pivot link connection between such end of the lever and the bracket, and a pivot link connection between the end of the spring and the lever, and a yielding support for the free end of the lever.

6. A spring suspension for road vehicles and the like comprising a leaf spring, a bracket carried by the axle and bent inwardly toward the spring, said bracket having a pivot eye, a lever in rotatable engagement with the leaf spring, a yielding support for one end of the lever, the other end of the lever being fulcrumed to and positioned above the bracket, and means for holding such lever fulcrumed in position at a point outside the pivot eye of the bracket.

7. A spring suspension for road vehicles and the like comprising a vehicle frame, a leaf spring, a bracket carried by the vehicle axle and inclined inwardly toward the frame, a lever in rotatable engagement with the leaf spring, a yielding support for one end of the lever, and means for attaching the other end of the lever to said bracket and holding it in position above and outside of the bracket so that the lever may rock about a pivot line above and outside of the end of the bracket.

8. A spring suspension for road vehicles and the like comprising a leaf spring, an apertured bracket carried by the axle inclined inwardly toward the spring, a lever in rotatable engagement with the spring, a yielding support for one end of the lever, and means engaging the aperture in the bracket extending upwardly and outwardly therefrom for fulcruming the other end of the lever at a point remote from the aperture in the bracket.

In testimony whereof, I affix my signature in the presence of two witnesses this 23rd day of July 1915.

LEWIS P. HALLADAY.

Witnesses:
    FRED C. BERTRAUX,
    G. MURRAY.